(12) United States Patent
Mysore Annaiah et al.

(10) Patent No.: US 11,051,223 B2
(45) Date of Patent: Jun. 29, 2021

(54) SYSTEM AND METHOD OF HANDOVER

(71) Applicant: Reliance Jio Infocomm Limited, Maharashtra (IN)

(72) Inventors: Mahesh Nayaka Mysore Annaiah, Karnataka (IN); Thomas John Schlangen, Maharashtra (IN)

(73) Assignee: RELIANCE JIO INFOCOMM LIMITED, Mumbai-Maharashtra (IN)

( * ) Notice: Subject to any disclaimer, the term of this patent is extended or adjusted under 35 U.S.C. 154(b) by 5 days.

(21) Appl. No.: 16/595,646

(22) Filed: Oct. 8, 2019

(65) Prior Publication Data
US 2020/0112899 A1 Apr. 9, 2020

(30) Foreign Application Priority Data
Oct. 8, 2018 (IN) .............................. 201821038128

(51) Int. Cl.
*H04W 36/08* (2009.01)
*H04W 36/00* (2009.01)
*H04W 36/30* (2009.01)
*H04W 36/38* (2009.01)

(52) U.S. Cl.
CPC ....... *H04W 36/08* (2013.01); *H04W 36/0085* (2018.08); *H04W 36/00835* (2018.08); *H04W 36/30* (2013.01); *H04W 36/38* (2013.01)

(58) Field of Classification Search
CPC ..... H04W 36/08; H04W 36/06; H04W 36/04; H04W 36/00835; H04W 36/0085; H04W 36/30; H04W 36/38; H04W 36/0083; H04W 36/0088; H04W 36/0087; H04W 36/305; H04W 72/04

USPC .......................................... 370/331
See application file for complete search history.

(56) References Cited

U.S. PATENT DOCUMENTS

| | | | | |
|---|---|---|---|---|
| 2007/0076664 A1* | 4/2007 | An | ........................ | H04L 67/147 370/331 |
| 2007/0142051 A1* | 6/2007 | Xu | ........................ | H04W 36/18 455/436 |
| 2009/0054075 A1* | 2/2009 | Boejer | ..................... | G01S 19/09 455/456.1 |
| 2009/0129338 A1* | 5/2009 | Horn | .................. | H04W 36/0007 370/331 |
| 2009/0290555 A1* | 11/2009 | Alpert | ................... | H04W 36/30 370/331 |
| 2009/0291686 A1* | 11/2009 | Alpert | ............... | H04W 36/0085 455/436 |

(Continued)

*Primary Examiner* — Phong La
(74) *Attorney, Agent, or Firm* — Hunton Andrews Kurth LLP

(57) ABSTRACT

A system and method, for performing proactive handover in a wireless network. A connection may be established between at least one user equipment and the wireless network via a serving cell. Further, at least one of a public transportation data, an end-user population handover performance data, a navigation data, and an end user handover performance data is received and analyzed to predicting at least one wireless handover route. A handover target probability is calculated for the at least one predicted wireless handover route, and analyzed to determine a next serving cell for the user equipment. Upon detecting a condition for handover, the user equipment is proactively handed over from the serving cell to the next serving cell.

9 Claims, 7 Drawing Sheets

(56) References Cited

U.S. PATENT DOCUMENTS

| | | | |
|---|---|---|---|
| 2010/0098021 A1* | 4/2010 | Stammers | H04W 36/0033 370/331 |
| 2010/0254346 A1* | 10/2010 | Jain | H04W 36/0055 370/331 |
| 2011/0194532 A1* | 8/2011 | Kakkad | H04W 12/0602 370/331 |
| 2013/0040683 A1* | 2/2013 | Siomina | H04W 28/0236 455/517 |
| 2015/0095445 A1* | 4/2015 | Thankappan | H04L 67/1097 709/214 |
| 2015/0327282 A1* | 11/2015 | Werner | H04W 72/085 455/450 |
| 2016/0021697 A1* | 1/2016 | Vargantwar | H04W 76/19 370/329 |
| 2016/0183138 A1* | 6/2016 | Murakami | H04W 36/0061 370/332 |
| 2016/0345228 A1* | 11/2016 | Liu | H04W 36/08 |
| 2017/0311208 A1* | 10/2017 | Yu | H04W 36/0058 |
| 2018/0359670 A1* | 12/2018 | Fang | H04W 36/385 |
| 2020/0178137 A1* | 6/2020 | Hassan Hussein | H04B 7/18504 |

\* cited by examiner

SYSTEM AND METHOD OF HANDOVER

CROSS REFERENCE TO RELATED APPLICATIONS

This application claims priority to Indian Patent Application No. 201821038128, filed Oct. 8, 2018, the disclosure of which is hereby incorporated by reference in its entirety.

TECHNICAL FIELD

The present invention relates to the technical field of wireless communication. More particularly, the present invention relates to a method for proactive and predictive handover in a route predicted wireless network or HetNet (heterogeneous network) environment.

BACKGROUND

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

The wireless technology in the licensed segment (like GSM, EDGE, HSPA, LTE, etc.) and the unlicensed segment (like Wi-Fi, UMA, DECT, Bluetooth, Zigbee, RFID, etc.) provides various communication services that have usually multiple access networks, support communications for multiple users by sharing the available network resources in both strata of the spectrum. The use of and development of such communications channels have grown exponentially in the recent years. The heterogeneous networks have more reliable protocols and better communications network and consumer hardware available, resulting in faster, efficient and smarter communication.

The handover of end-user wireless devices within a wireless network is a key function of cellular wireless networks for decades. Handover generally relates to transferring a user equipment call from a source cell to a target cell to avoid terminating or dropping the call, e.g., when an associated UE moves away from the source cell. Conventionally, two types of handover exist: hard handover and soft handover. Hard handover utilizes a break-then-make procedure in which a channel of a source cell associated with a call is released before another channel in a target cell is utilized for the call. Soft handover utilizes a make-then-break procedure in which the channel of the source cell is used while the channel of the target cell is used for connection to the target cell, such that the connection with target cell is established before breaking the connection to the source cell.

Though improvements in radio technology and radio measurement configuration options have improved handover success rates, yet, handover remains a reactive process, which is subject to the geographical peculiarities of the network, variations in the speed and direction of end-users, the ability of wireless devices to accurately measure radio conditions, and the ability of the wireless network to make optimal handover decisions quickly enough to maintain radio connectivity for a rapidly growing population of users and devices.

There are several factors that make handover selection a challenge in the current scenario. For instance, firstly, the traditional network planning, deployment, and optimization have become very cumbersome as the number of network elements is becoming extremely large (e.g., millions of devices) that makes handover difficult. Secondly, the current handover techniques remain a reactive process, which is subject to the geographical peculiarities of the network, variations in the speed and direction of end-users, the ability of wireless devices to accurately measure radio conditions, and the ability of the wireless network to make optimal handover decisions quickly enough to maintain radio connectivity for a rapidly growing population of users and devices.

Thirdly, mobility varies dramatically across the population of end-users while existing handover configuration and decision-making logic is static across that population; this "one size fits all" methodology can lead to handover failures. Fourthly, the current handover techniques are more towards reactive rather than proactive and predictive handover methods, which does not improve the overall handover success rate in wireless networks.

Also, there are challenges for predicting routes for mobility users in wireless network to prepare them for proactive handover to optimize the experience of the users. For instance, in a sparse network, the existing solutions may be sufficient, but in a dense network, proactive handover are gradually becoming a need, and more robust handover methods are required (i.e., often a "right choice handover" will not be available, and the novel method must provide "efficient handover").

Therefore, there is a need of automatic novel method for proactively predicting the routes of mobility users in wireless network for handover based upon proactive measures like expected end-user route(s), which are discovered from external network sources and/or feedback mechanism learning from the history of user-specific behavior using data analytics modules in either a sparse or dense wireless network serving a particular area, in order to maximize the optimal utilization of available wireless band to achieve higher aggregate network throughput, and improve overall user experience.

SUMMARY

This section is provided to introduce certain objects and aspects of the present disclosure in a simplified form that are further described below in the detailed description. This summary is not intended to identify the key features or the scope of the claimed subject matter.

In order to overcome at least a few problems associated with the known solutions as provided in the previous section, an object of the present invention is to provide a novel automatic method for proactive and predictive routes of mobility users in wireless network for handover based upon proactive measures like expected end-user route(s), which are discovered from external network sources and/or feedback mechanism learning from the history of user-specific behavior using data analytics modules in either a sparse or dense wireless network serving a particular area. Another object of the present disclosure is to provide a novel method for evaluating of the route and signal strength, which enables the selection of an optimal proactive and predictive handover channel on the route for the user. Yet another object of the present disclosure is to provide proactive and predictive handover methods, which will improve the overall handover success rate in wireless networks. Another object of the present disclosure is to provide a novel mechanism to choose optimal handover channel so as to maximize the utilization of available wireless band. Yet another object of the present disclosure is to provide an efficient and effective novel mechanism of choosing optimal handover channel based on optimum handover route normalization scheme. Yet another object of the present disclosure is to provide an efficient and effective novel mechanism of choosing optimal handover channel based on scheme of signal strength enabling computing of channel viability applied over a desired wireless band. Yet another object of the present disclosure is to provide an efficient and effective novel mechanism of choosing optimal handover channel based on handover affinity scheme that provides a bias toward channels present in optimal route patterns. Yet another object of the present disclosure is to choose optimal handover channel for a plurality of wireless handover points to increase the overall aggregate network throughput of the plurality of wireless points. Yet another object of the present disclosure is to choose optimal handover channel for a plurality of wireless handover points to increase the overall user experience for the wireless users getting wireless services from the plurality of wireless handover points. Yet another object of the present disclosure is to provide users with the features and ability to receive seamless services simultaneously or sequentially consequently without any latency and call drops during proactive and predictive handover. Yet another object of the present disclosure is to provide features and ability to handle high volume calls on the route of users, concurrently. Yet another object of the present disclosure is to choose optimal handover channel for a plurality of wireless handover points to a variety of other wireless network technologies and architectures based on the handover affinity matrix, normalization scheme factor and normalized signal strength factor for evaluation using the normalized factors to evaluate the optimal handover channel.

In order to achieve at least some of the above-mentioned objectives, the present disclosure provides a method for performing handover in a wireless network, and a network entity therefor. A first aspect of the present invention relates to a method of performing handover in a wireless network. The method comprises, establishing a connection between a user equipment and the wireless network via a serving cell. Subsequently, at least one of a public transportation data, an end-user population handover performance data, a navigation data, and an end user handover performance data is received. Based on an analysis of at least one of the public transportation data, the end-user population data, the navigation data, and the end user data, at least one wireless handover route is predicted. Further, a handover target probability is calculated for the at least one predicted wireless handover route. Next, the handover target probability is analyzed to determine a next serving cell for the user device along the predicted at least one wireless handover route. The user equipment is continuously monitored to determine an event for handover of the user equipment. Thereafter, the user equipment is proactively handed over from the serving cell to the next serving cell.

Another aspect of the present disclosure relates to a network entity. The network entity further comprises a memory unit, a transceiver, a processor, and a handover engine. The transceiver is connected to the memory unit, and the transceiver is configured to establish a connection between a user equipment and the wireless network via a serving cell, and to receive at least one of a public transportation data, an end-user population handover performance data, a navigation data, and an end user handover performance data. The processor is connected to the transceiver and the memory unit, said processor configured to predict at least one wireless handover route based on an analysis of at least one of the public transportation data, the end-user population data, the navigation data, and the end user data. The processor is also configured to calculate a handover target probability for the at least one predicted wireless handover route. The handover engine is connected to the processor, the transceiver and the memory unit, and the handover engine is configured to analyze the handover target probability to determine a next serving cell for the user equipment along the predicted at least one wireless handover route. The handover engine is also configured to continuously monitor the user equipment to determine an event for handover of the user equipment, and to proactively hand over the user equipment from the serving cell to the next serving cell.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Also, the embodiments shown in the figures are not to be construed as limiting the disclosure, but the possible variants of the method and system according to the disclosure are illustrated herein to highlight the advantages of the invention. It will be appreciated by those skilled in the art that disclosure of such drawings includes disclosure of electrical components or circuitry commonly used to implement such components.

Figure 1:
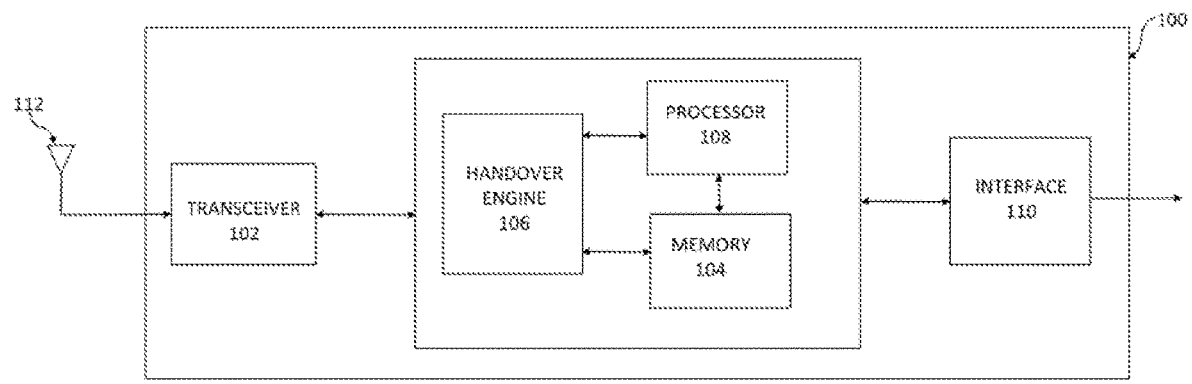
FIG. 1 illustrates an exemplary diagram of the network entity [100], in accordance with exemplary embodiments of the present disclosure.

The foregoing shall be more apparent from the following more detailed description of the disclosure.

DESCRIPTION OF THE INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

In addition, the disclosed subject matter may be implemented as a method, apparatus, or article of manufacture using standard programming and/or engineering techniques to produce software, firmware, hardware, or any combination thereof to control a computer to implement the disclosed subject matter.

As used herein, a "processor" or "processor" includes one or more processors, wherein processor refers to any logic circuitry for processing instructions. A processor may be a general-purpose processor, a special-purpose processor, a conventional processor, a digital signal processor, a plurality of microprocessors, one or more microprocessors in association with a DSP core, a controller, a microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processor is a hardware processor.

As used herein, a "controller" or "control unit" includes one or more controllers, wherein the controller refers to any logic circuitry for processing instructions. A controller may be a general-purpose controller, a special-purpose controller, a conventional controller, a digital signal controller, a plurality of microcontrollers, one or more microcontrollers in association with a DSP core, a microcontroller, Application Specific Integrated Circuits, Field Programmable Gate Array circuits, any other type of integrated circuits, etc. The controller may perform signal coding, data processing, input/output processing, and/or any other functionality that enables the working of the system according to the present disclosure. More specifically, the controller or control unit is a hardware processor.

As used herein, "memory unit" refers to a machine or computer-readable medium including any mechanism for storing information in a form readable by a computer or similar machine. For example, a computer-readable medium includes read-only memory unit ("ROM"), random access memory unit ("RAM"), magnetic disk storage media, optical storage media, flash memory unit devices or other types of machine-accessible storage media.

As used herein, the "wireless network" may include, but not limited to any private or public wireless network that may be presently implemented or deployed, and any wireless network that may be deployed in the future. The wireless network may also be a later or newer technology of wireless LTE network for example LTE, LTE-A, LTE-B LTE-C, voice over LTE etc. or any other such wireless network technology obvious to a person skilled in the art. The wireless network is capable of providing one of a long-range and short-range wireless communication.

As used herein, "network entity" is an entity that serves a cellular network for providing voice services (calls) and the data services to the user equipment. The network entity may include, but not limited to, a base station controller, a base transceiver station, a cell site, a Node B, an eNodeB, a gNB, a radio network controller, and any such entity obvious to a person skilled in the art.

Moreover, terms like "user equipment" (UE), "user device", and similar terminology refer to a wireless device utilized by a subscriber or user of a wireless communication service to receive and/or convey data associated with voice, video, sound, and/or substantially any data-stream or signaling-stream via a wireless network. It may refer to any computing device including, but not limiting to, a mobile phone, a smart phone, a tablet, a wearable device, a phablet, and any such device as may be obvious to a person skilled in the art. Further, the user device may comprise an input means such as a keyboard, an operating system, a memory unit, an interface. Further, the foregoing terms are utilized interchangeably in the subject specification and related drawings.

The subject disclosure relates to methods and apparatus that provide a novel automatic method for proactive and predictive routes of mobility users in a wireless network for handover based upon proactive measures.

The proactive measure may include expected end-user route(s), which are discovered from external network sources and/or feedback mechanism learning from the history of user-specific behavior using data analytics modules in either a sparse or dense wireless network serving a particular area.

Referring to FIG. 1, illustrates an exemplary block diagram of a network entity [100], in accordance with exemplary embodiments of the present disclosure. The network entity [100] may be connected to at least one user equipment via a wireless network. The user equipment may further be connected to the wireless network via a serving cell. The network entity [100] may be a part of the wireless network and reside in the wireless network. Alternatively, the network entity [100] may be an independent entity, and may reside outside the wireless network.

The network entity [100] may provide network access to the at least one user equipment connected to the network entity [100] and thereby, the at least one user equipment may avail voice and data services using said network. The network entity [100] is also capable of supporting and performing handover of the at least one user equipment in the wireless network.

The network entity [100] may be one or more cellular network entities in a wireless network that serves a network for providing voice services (calls) and the data services to the at least one user equipment. The network entity [100] may include, but not limited to, a base station controller, a base transceiver station, a cell site, a Node B, an eNodeB, a gNB, a radio network controller, etc.

The wireless network can include a local wireless communications cite (or base station), which can use a licensed radio spectrum operated and controlled by a wireless service provider. A user equipment operated by a subscriber within a coverage area typically communicates with a core network via the base station. The user equipment can register with the base station and communication, e.g., voice traffic, data traffic, can be routed to the subscriber through the base station utilizing the licensed radio spectrum. The base station can employ a backhaul network, e.g., broadband wired or wireless network backbone, to route packet communication, e.g., voice traffic, data traffic, data, to the core network.

The network entity [100] comprises at least one memory unit [104], at least one transceiver [102], at least one processor [108], and at least one handover engine [106]. The network entity [100] may further comprise of at least one antenna [112] and at least one interface [110]. All the above said components of the network entity [100] are connected to each other.

The transceiver [102] of the user equipment [200] is coupled to said antenna [112], the memory unit [104], the processor [108], the handover engine [106] and the interface [110]. The transceiver [102] may further include at least one transmission unit and at least one receiving unit (not shown in Figure). The transceiver [102] may be configured to transmit communication signals/data via the wireless network to a user equipment or another network entity via the antenna [112]. The transceiver [102] may be configured to receive communication signals/data via the wireless network from a user equipment via the antenna [112].

The transceiver [102] is configured to establish a connection between a user equipment and the wireless network via a serving cell. The transceiver [102] is also configured to receive at least one of a public transportation data, an end-user population handover performance data, a navigation data, and an end user handover performance data.

As used herein, "public transportation data" may refer to any transportation data related to land, air and sea/under sea. All the transportation medium will generate data from the users in these public transport in either land, sea or air.

As used herein, "end-user population handover performance data" may refer to performance measurements and key performance indicators (KPIs) defined for a population. For instance, the performance measurements and KPIs as specified by 3GPP for handovers, for example, Inter RAT handover success rate, etc. For example, say a bus with capacity of 40 passengers starts moving towards its destination, the passengers travelling in the bus constitutes an end-user population and all these users will be handed over together as a population, as and when the bus crosses from one cell to another. The performance measurements and KPIs associated with this end-user population shall be considered for the purpose of this invention.

As used herein, "navigation data" may refer to GPS coordinates, UE History information including cells, beams, RAN Notification areas, Tracking Areas, Positioning data, etc. Basically, the navigation location data of the UE is either sent by UE or generated within the network itself.

As used herein, "end user handover performance data" may refer to performance measurements and key performance indicators (KPIs) defined for each of the at least one user equipment connected to the wireless network. For instance, for intra-frequency handovers the parameters may include, but not limited to, number of successful fast handovers, number of successful very fast handovers, number of failed fast handovers, number of failed very fast handovers, number of handovers to wrong cells [low probability cells], number of too early handovers, number of too late handovers, number of handovers for which all requested ERABS are accepted, number of handovers for which only part of the requested ERABS are accepted, number of X2 based handovers, number of S1 based handovers, number of forced handovers, etc. A person skilled in the art may understand that the same or more parameters shall be used for inter-frequency handovers and the Inter-RAT Handovers.

Further, the processor [108] of the network [100] is coupled to said antenna [112], the transceiver [102], the memory unit [104], and the handover engine [106]. Generally, the processor [108] may be configured to execute functions/operations performed by each module/component of the network entity [100]. The processor as used herein may include, but not limited to, a processor or set of processors such as a microprocessor, a multicore microprocessor, a digital signal processor, a collection of electronic circuits, or a combination thereof and may be configured to perform operations/functions as described herein.

Particularly, the processor [108] is configured to predict at least one wireless handover route based on an analysis of at least one of the public transportation data, the end-user population data, the navigation data, and the end user data. For instance, the processor [108] may predict a route that may be taken by the user along the course of his travel, and may accordingly predict a wireless handover route representing mapping of probable target cells (or next best serving cells) along the user's route.

The processor [108] may further be configured to calculate a handover target probability for the at least one predicted wireless handover route. As used herein, "handover target probability" may refer to probability data associated with handover rate for each of the neighbor cells towards which a user equipment may move through the wireless predicted route. For example, a serving cell with which the user equipment is connected may have three neighbor cells to which the user equipment may be handed over. Say, the probability data calculated for this user equipment as per the chosen ranked route is that Neighbor-1 has probability of 0.3, Neighbor-2 has probability of 0.7 and Neighbor-3 has probability of 0.98. Then, the serving cell will choose Neighbor-3 as the next serving cell (or the target cell) for handover as it has highest probability among its neighbors.

The handover engine is coupled to the transceiver [102], the processor [108] and the memory unit [104]. The handover engine [106] is configured to analyze the handover target probability to determine a next serving cell for the user equipment along the predicted at least one wireless handover route. The handover engine [106] is configured to continuously monitor the user equipment to determine an event for handover of the user equipment. The handover engine [106] is configured to proactively hand over the user equipment from the serving cell to the next serving cell.

Thus, per present invention, the public transportation data, the end-user population data, the navigation data, and the end user data assists in predicting a route (say, a travel pattern of a user equipment). For instance, analysis of the user equipment data either at MDAS or NWDAF aids in getting the user equipment travelling patterns. Based on the route to be taken by the user equipment (and/or the travelling pattern), the serving cell can proactively prepare the handovers in specific candidate sells in advance before the actual user equipment requests for the handover through measurement reports.

While analyzing the handover target probability, the handover engine [106] is further configured to identify at least one candidate serving cell along the at least one predicted wireless handover route. The handover engine [106] then assigns an initial score to the at least one candidate serving cell along the at least one predicted wireless route. The initial score may be assigned to each of the candidate cells such that it represents the value of each candidate cell under ideal radio conditions. The handover engine [106] is then configured to dynamically modify the initial score of the at least one candidate serving cell along the at least one predicted wireless route based on certain criterion.

For instance, evaluation and modification of the initial score of the candidate cells along all possible wireless routes is done in a way where each of neighboring wireless route is checked, one by one, for an already allocated/assigned wireless route channel. In case, a neighboring wireless route has already been assigned, then for each of the candidate cells along the wireless route the score is increased. The score may also be modified based on the candidate cells signal strength and channel overlapping parameter.

Further, the handover engine [106] may be configured to apply a handover bias to the initial score of the at least one candidate serving cell. Thereafter, the handover engine [106] selects the at least one candidate cell as the next serving cell based on at least the modified score of the at least one candidate cell.

While continuously monitoring the user equipment, the handover engine [106] is further configured to configure the user equipment for proactive handover. For instance, the handover engine [106] may further be configured to gather information pertaining to best routes [probability based], handover bias [if needed], required set of resources [physical resource blocks (PRBs)], time and duration of the day/week, etc. For another instance, the handover engine [106] may prepare the user equipment for proactive handover by notifying installation of a new setup (for e.g. firmware upgrade, software updation, etc.) relating to the proactive handover.

The handover engine [106] further continuously detects at least one condition for proactive handover preparation. The conditions for proactive handover preparation include, but not limited to, that the load of the tentative neighbor cells (as received in best routes in proactive handover configurations) are below the threshold; or that the tentative neighbor cells (as received in best routes in proactive handover configurations) are up and running (not in energy saving mode); or that sufficient incoming handover resources are made available in the tentative neighbor cells (as received in best routes in proactive handover configurations); or forced handovers may be used, as the route is fixed (for example, the path taken by a train is fixed and hence the set of target cells are known in advance).

For instance, the handover engine [106] may detect that a user equipment is in transit and that a user is travelling, accordingly, when a user is about to change its network area (network circle) the handover engine [106] may detect a condition for preparation of proactive handover. For example, the user equipment shall be a member of the transportation route, for example, if a person or a group of people buys the train/bus/flight tickets and boards the train/bus/flights as specified in the ticket, or if a person enters a cell and gets connected, who takes a specific path normally. For another example, a person early in the morning, say from 5:30 am to 6:30 am, goes for a jogging in a specific route.

Based upon detecting a condition for preparation of proactive handover, handover engine [106] may be configured to prepare the wireless network and the user equipment for the proactive handover. For instance, according to the at least one predicted wireless handover route, the handover engine [106] (and the serving cell) waits for the time and day (as received in proactive handover configuration) for the specific user equipment and/or for the set of end-user population, and a bit early, it configures the user equipment to perform measurements on the specific neighbor cells as mentioned in the best routes (as received in proactive handover configuration). Once serving cell receives the appropriate measurement results about the configured neighbor cells from the user equipment, it triggers the handover preparation procedures towards the reported neighbor cells (next serving cell) either using X2/Xn procedures or S1/NG procedures based on the target cell. For another instance, the handover engine [106] may send a notification or an attention (AT) command to the user equipment via the wireless network alarming them for proactive handover.

Further, the handover engine [106] may be configured to continuously detect conditions for proactive handover execution. The conditions for proactive handover execution include, but not limited to, that a triggered handover preparation procedure towards a tentative target cells is successful; or that a user equipment is still in connected state; or that specific handover bias if applicable (as received in best routes in proactive handover configurations). For instance, the handover engine [106] may detect that a user equipment is just going to change or at the verge of changing network area (network circle) and the handover engine [106] determines that there exists a condition for execution of proactive handover.

Accordingly, the handover engine [106] may be configured to reserve at least one resource of the wireless network for the proactive handover execution, for instance, reserving physical resource blocks (PRBs) at the candidate cells. The handover engine [106] may further be configured to release unused resources of the wireless network. For example, let us say, a user equipment is a fast-moving user equipment travelling in a bullet train, then the proactive handover design reserves resources in advance in cells [cell-a, cell-b, cell-c and cell-d] along the route for the user equipment. So, when the train starts moving, it first enters the cell-a and provides services to the user equipment via cell-a resource. When the train continues to move ahead, it then enters to cell-b and the user equipment gets handed over to cell-b from cell-a, through proactive handover. Resultantly, as the resources in cell-a is going to be unused, the resources in cell-a needs to be released so that other users can be serviced.

The interface [110] may be coupled to the transceiver [102] and processor [108] and the memory unit [104]. The interface [110] may be configured for backhaul and to further reach out to a server for information exchange.

The memory unit [104] is coupled to said antenna [112], the transceiver [102], the handover engine [106], the processor [108], and the interface [110]. The memory unit [104] may be configured to store a list of the at least one predicted wireless handover route. The memory unit [104] may further be configured to store a list of at least one candidate serving cell along the at least one predicted wireless handover route.

Figure 2:
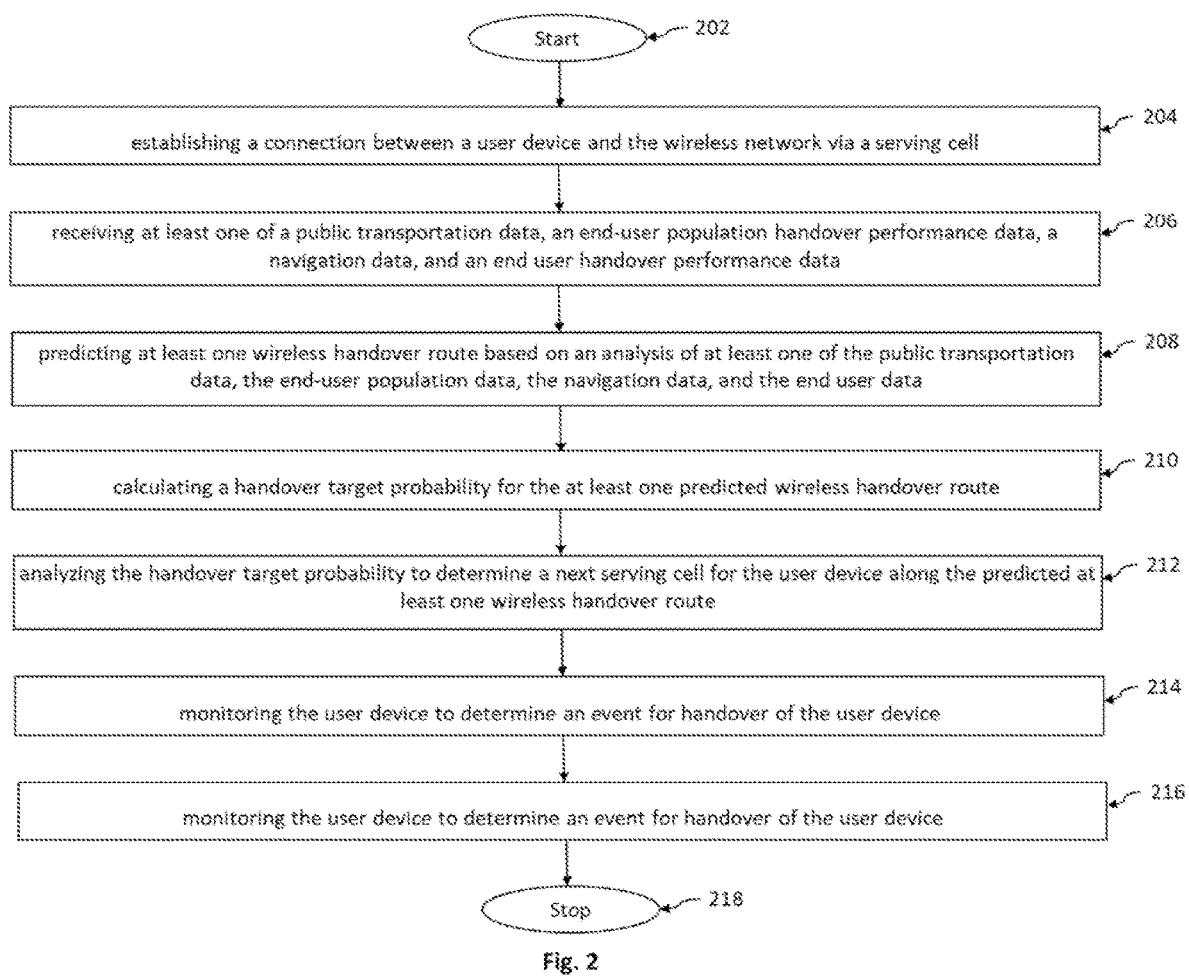
FIG. 2 an exemplary method flow diagram [200] depicting method for performing handover in a wireless network, in accordance with exemplary embodiments of the present disclosure.

FIG. 2 illustrates an exemplary method flow diagram [200] depicting method for performing handover in a wireless network, in accordance with exemplary embodiments of the present disclosure. The method may be implemented at the wireless network. For instance, the method may be implemented at the network entity [100] residing at the wireless network.

The method begins at step 202. At step 204, the method starts with establishing of a connection between a user equipment and the wireless network via a serving cell. Further, a connection may be established between the user equipment and the network entity [100] of the wireless network via a serving cell. For instance, the transceiver unit [102] may be configured to establish the connection between the user equipment and the network entity of the wireless network.

Once the connection is established between the user equipment and the wireless network, at step 206, at least one of a public transportation data, an end-user population handover performance data, a navigation data, and an end user handover performance data is dynamically received at the wireless network. The step 206 of dynamically receiving said information may occur throughout the period of time that the user equipment is connected to the network entity [100], i.e. the data may be received continuously. For instance, the said information may be received at the transceiver [102] of the network entity [100] from various sources.

At step 208, the above-said information, i.e., at least one of the public transportation data, the end-user population data, the navigation data, and the end user data, is analyzed to predict at least one wireless handover route. The processor [108] of the network entity [100] is configured to predict at least one wireless handover route based on an analysis of at least one of the public transportation data, the end-user population data, the navigation data, and the end user data. For instance, the end user data received at the network entity [100] from a user equipment may indicate that the user goes for a walk along a specific route every day between 5:30-6:30 AM, such that handover is required along such route. Thus, based on this information, the network entity [100] predicts the handover route that the user equipment will go through when the user goes for a walk on his everyday route. Predicting the handover probability route may include predicting the number of handovers required along the user's route. Further, for each required handover, one or more neighboring candidate cells may be identified which can be the next serving cells. Condition for handover may also be determined, for instance, it may be analyzed that the user equipment along a specific route is handed over at 5:56-6:00 AM every day during the user's morning walk routine.

Next, at step 210, a handover target probability is calculated for the at least one predicted wireless handover route. The processor [108] of the network entity [100] is configured to calculate a handover target probability for the at least one predicted wireless handover route. For instance, for each handover along a user's route, the probability of the user equipment latching on to each of the neighboring candidate cells is calculated. The handover target probability may be in the form of a fractional number.

Further, at step 212, the handover target probability is analyzed to determine a next serving cell for the user equipment along the predicted at least one wireless handover route. The handover engine [106] of the network entity [100] is configured to analyze the handover target probability to determine a next serving cell for the user equipment along the predicted at least one wireless handover route. For instance, for each required handover, the cell with the highest handover target probability may be determined to be the next serving cell.

At step 214, the user equipment is continuously monitored to determine an event for handover of the user equipment. The handover engine [106] of the network entity [100] is configured to continuously monitor the user equipment to determine an event for handover of the user equipment. The step 214 of continuously monitoring the user equipment may occur throughout the period of time that the user equipment is connected to the wireless network. For instance, continuing the above example, an event may occur at 5:52 AM, i.e. a little before the predicted handover time of the user equipment (5:56 AM-6:00 AM).

Thereafter, at step 216, the user equipment is proactively handed over from the serving cell to the next serving cell. The handover engine [106] of the network entity [100] is configured to proactively handover from the serving cell to the next serving cell.

Further, the method encompasses that analyzing the handover target probability may further comprise identifying at least one candidate serving cell along the at least one predicted wireless handover route. An initial score is assigned to the at least one candidate serving cell along the at least one predicted wireless route. The initial score may be assigned to each of the candidate cells such that it represents the value of each candidate cell under ideal radio conditions. The initial score of the at least one candidate serving cell along the at least one predicted wireless route may then be dynamically modified based on certain criterion.

For instance, evaluation and modification of the initial score of the candidate cells along all possible wireless routes is done in a way where each of neighboring wireless route is checked, one by one, for an already allocated/assigned wireless route channel. In case, a neighboring wireless route has already been assigned, then for each of the candidate cells along the wireless route the score is increased. The score may also be modified based on the candidate cells signal strength and channel overlapping parameter.

Further, a handover bias is applied to the initial score of the at least one candidate serving cell. Thereafter, the at least one candidate cell is selected as the next serving cell based on at least the modified score of the at least one candidate cell. For instance, the candidate serving cells with the highest score may be selected as the next serving cell.

Alternatively, the at least one candidate cell is selected as the next serving cell to minimize a handover interference.

In another instance, the method [200] encompasses that while continuously monitoring the user equipment, the method may further comprise configuring the user equipment for proactive handover. For instance, the handover engine [106] may further be configured to gather information pertaining to best routes [probability based], handover bias [if needed], required set of resources [physical resource blocks (PRBs)], time and duration of the day/week, etc. For instance, the handover engine [106] may prepare the user equipment for proactive handover by notifying installation of a new setup (for e.g. firmware upgrade, software updation, etc.) relating to the proactive handover.

Next, at least one condition for proactive handover preparation is continuously detected. The conditions for proactive handover preparation include, but not limited to, that the load of the tentative neighbor cells (as received in best routes in proactive handover configurations) are below the threshold; or that the tentative neighbor cells (as received in best routes in proactive handover configurations) are up and running (not in energy saving mode); or that sufficient incoming handover resources are made available in the tentative neighbor cells (as received in best routes in proactive handover configurations); or forced handovers may be used, as the route is fixed (for example, the path taken by a train is fixed and hence the set of target cells are known in advance); or any other condition that a person skilled in the art may deem fit.

For instance, the handover engine [106] may detect that a user equipment is in transit and that a user is travelling, accordingly, when a user is about to change its network area (network circle) the handover engine [106] may detect a condition for preparation of proactive handover. For example, the user equipment shall be a member of the transportation route, for example, if a person or a group of people buys the train/bus/flight tickets and boards the train/bus/flights as specified in the ticket, or if a person enters a cell and gets connected, who takes a specific path normally. For another example, a person early in the morning, say from 5:30 am to 6:30 am, goes for a jogging in a specific route.

Further, based upon detecting a condition for preparation of proactive handover, the method proceeds to prepare the wireless network and the user equipment for the proactive handover. For instance, according to the at least one predicted wireless handover route, the handover engine [106] (and the serving cell) waits for the time and day (as received in proactive handover configuration) for the specific user equipment and/or for the set of end-user population, and a bit early, it configures the user equipment to perform measurements on the specific neighbor cells as mentioned in the best routes (as received in proactive handover configuration). Once serving cell receives the appropriate measurement results about the configured neighbor cells from the user equipment, it triggers the handover preparation procedures towards the reported neighbor cells (next serving cell) either using X2/Xn procedures or S1/NG procedures based on the target cell. For instance, the handover engine [106] may send a notification or an attention (AT) command to the user equipment via the wireless network alarming them for proactive handover.

Furthermore, the method involved continuously detecting conditions for proactive handover execution. The conditions for proactive handover execution include, but not limited to, that a triggered handover preparation procedure towards a tentative target cells is successful; or that a user equipment is still in connected state; or that specific handover bias if applicable (ss received in best routes in proactive handover configurations); or any other condition that a person skilled in the art may deem fit.

Thereafter, the method comprises reserving at least one resource of the wireless network for the proactive handover execution. For example, let us say, a user equipment is a fast-moving user equipment travelling in a bullet train, then the proactive handover design reserves resources in advance in cells [cell-a, cell-b, cell-c and cell-d] along the route for the user equipment. So, when the train starts moving, it first enters the cell-A and provides services to the user equipment via cell-A resource. When the train continues to move ahead, it then enters to cell-B and the user equipment gets handed over to cell-B from cell-A, through proactive handover. Resultantly, as the resources in cell-a is going to be unused, the resources in cell-A needs to be released so that other users can be serviced.

Figure 3:
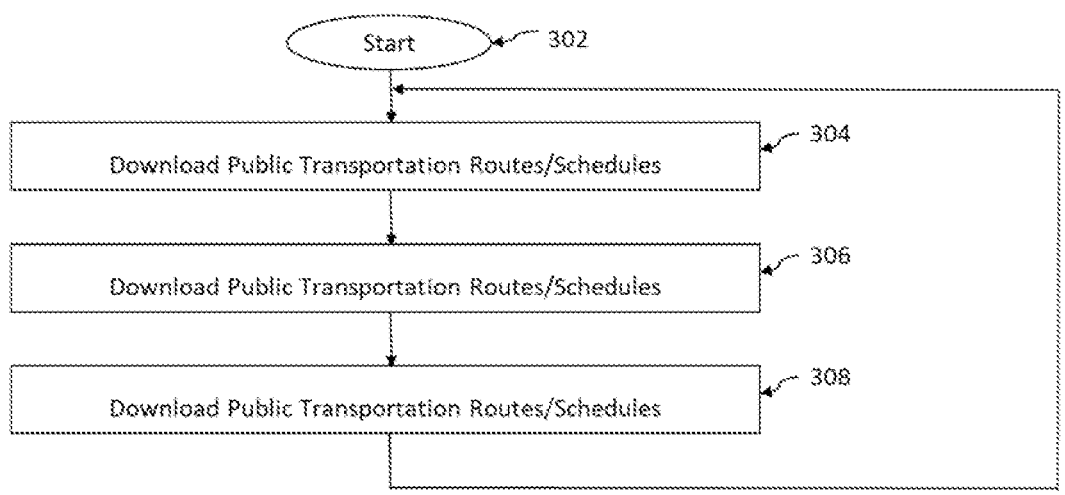
FIG. 3 illustrates an exemplary schematic diagram of the public transportation data analysis flow, in accordance with exemplary embodiments of the present disclosure.

Referring to FIG. 3, illustrates an exemplary schematic diagram of the end-user population mobility data analysis flow, in accordance with exemplary embodiments of the present disclosure. The method flow starts at step 302. At step 304, the method flow comprises receiving Public Transportation Routes/Schedules for the desired users. For instance, the said Public Transportation Routes/Schedules may be received as input from the user or, alternatively, may be downloaded from a network resource or third-party sources. Next, at step 306, the said Public Transportation Routes/Schedules is analyzed to determine a handover target probability. Further, at step 308, the calculated handover target probability data is pushed to the wireless network. The method flow as illustrated in FIG. 3 is a continuous method and may occur throughout the period of time that the user equipment is connected to the wireless network.

Figure 4:
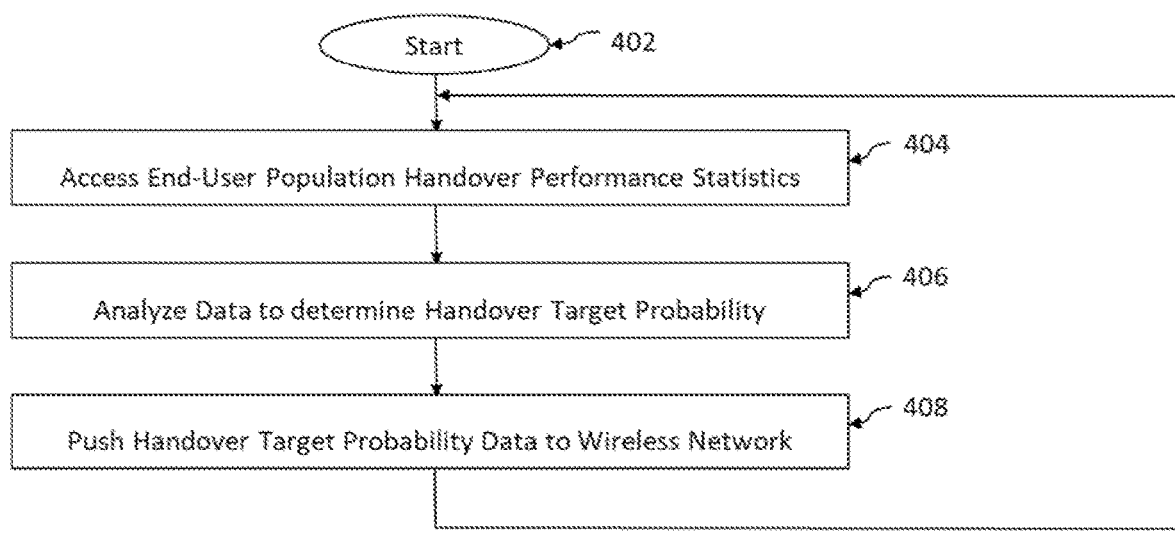
FIG. 4 illustrates an exemplary schematic diagram of the end-user population mobility data analysis flow, in accordance with exemplary embodiments of the present disclosure.

Referring to FIG. 4, illustrates an exemplary schematic diagram of the end-user population mobility data analysis flow, in accordance with exemplary embodiments of the present disclosure. The method flow starts at step 402. At step 404, the method flow comprises receiving Access End-User Population Handover Performance Statistics. For instance, the said Access End-User Population Handover Performance Statistics may be received as input from the wireless network components in a region or, alternatively, may be downloaded from an independent network resource. Next, at step 406, the said Access End-User Population Handover Performance Statistics is analyzed to determine a handover target probability. Further, at step 408, the calculated handover target probability data is pushed to the wireless network. The method flow as illustrated in FIG. 4 is a continuous method and may occur throughout the period of time that the user equipment is connected to the wireless network.

Figure 5:
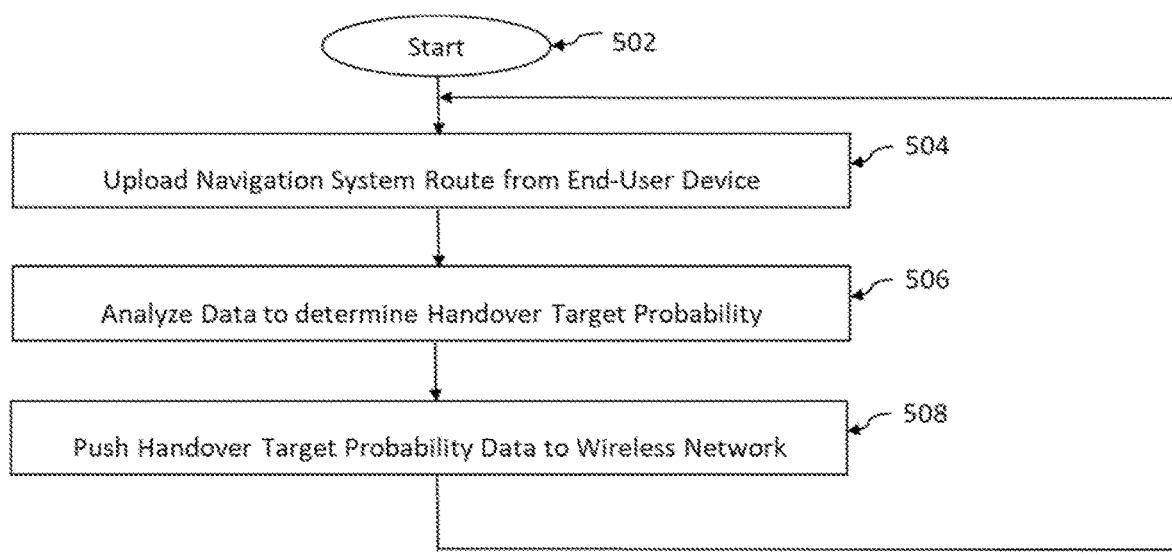
FIG. 5 illustrates an exemplary schematic diagram of the specific end-user navigation system data analysis flow, in accordance with exemplary embodiments of the present disclosure.

FIG. 5 illustrates an exemplary schematic diagram of the specific end-user navigation system data analysis flow, in accordance with exemplary embodiments of the present disclosure. The method flow starts at step 502. At step 504, the method flow comprises receiving Navigation System Route from End-User Equipment. For instance, the said Navigation System Route may be uploaded by the end-user equipment. Next, at step 506, the said Navigation System Route is analyzed to determine a handover target probability. Further, at step 508, the calculated handover target probability data is pushed to the wireless network. The method flow as illustrated in FIG. 5 is a continuous method and may occur throughout the period of time that the user equipment is connected to the wireless network.

Figure 6:
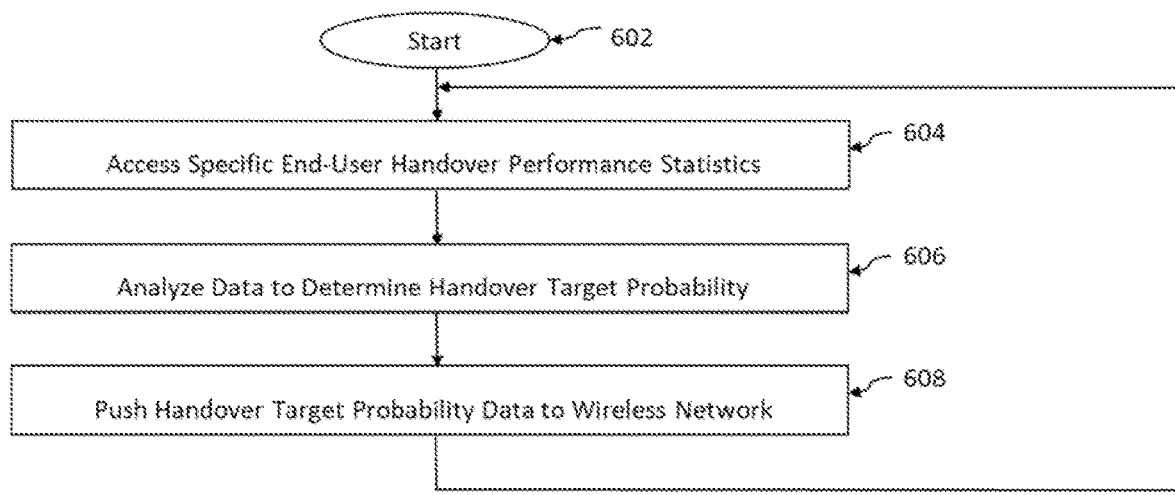
FIG. 6 illustrates an exemplary schematic diagram of the specific end-user mobility data analysis flow, in accordance with exemplary embodiments of the present disclosure.

FIG. 6 illustrates an exemplary schematic diagram of the specific end-user mobility data analysis flow, in accordance with exemplary embodiments of the present disclosure. The method flow starts at step 602. At step 604, the method flow comprises receiving Specific End-User Handover Performance Statistics. For instance, the said Specific End-User Handover Performance Statistics may be received from the end-user equipment, or alternatively, may be accessed from a wireless network resource. Next, at step 606, the said Specific End-User Handover Performance Statistics is analyzed to determine a handover target probability. Further, at step 608, the calculated handover target probability data is pushed to the wireless network. The method flow as illustrated in FIG. 6 is a continuous method and may occur throughout the period of time that the user equipment is connected to the wireless network.

Figure 7:
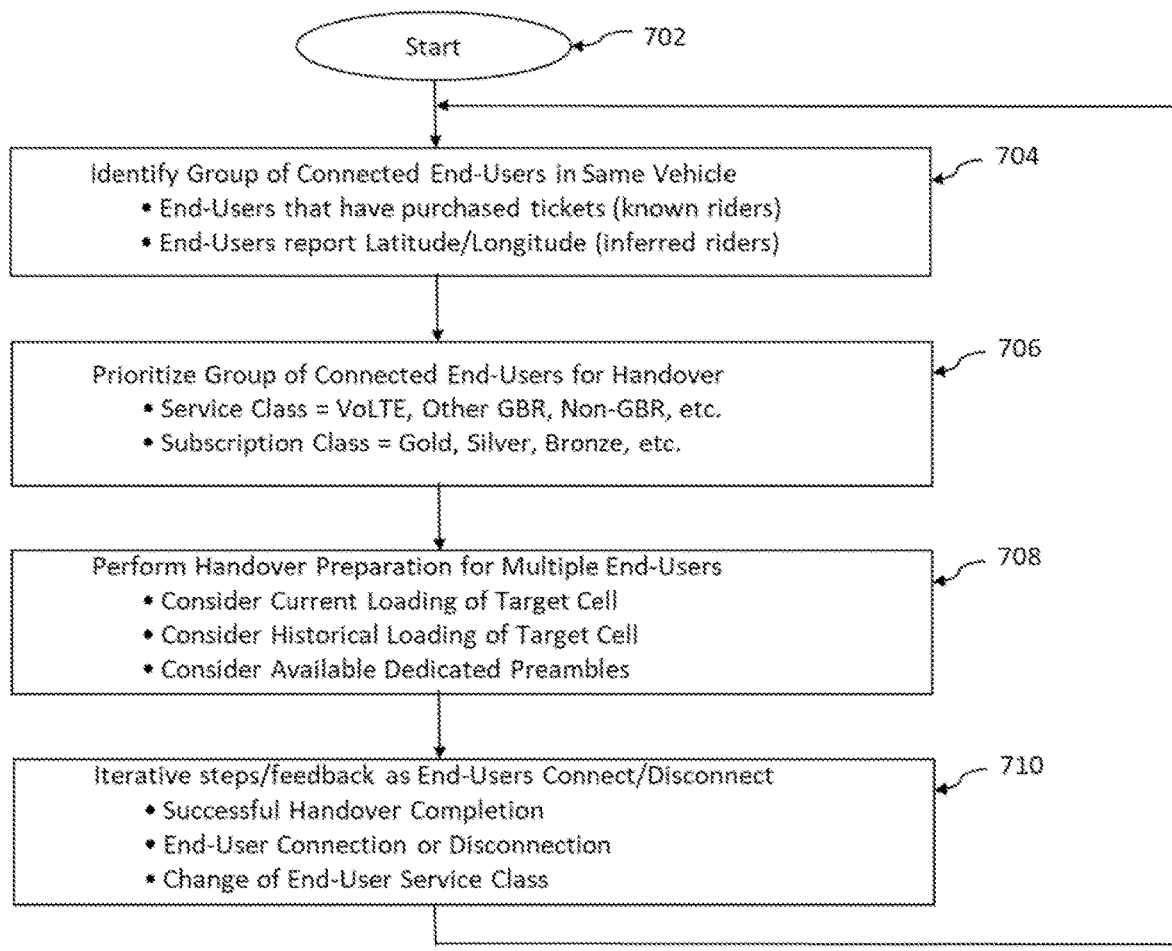
FIG. 7 illustrates an exemplary schematic diagram of the end-user group handover prioritization process flow, in accordance with exemplary embodiments of the present disclosure.

FIG. 7 illustrates an exemplary schematic diagram of the end-user group handover prioritization process flow, in accordance with exemplary embodiments of the present disclosure. The method flow starts at step 702. At step 704, the method flow comprises identifying a group of connected end-users that may be travelling in the same vehicle. For instance, the group of connected end-users may be identified based on either end-users may have purchased tickets which could be determined based on ticketing system information, or latitude/longitude information of the group of end-users.

At step 706, the method flow comprises prioritizing group of connected end-users for handover. For instance, the group of connected end-users may be prioritized based either on a class of service availed by such end-users (for e.g., VoLTE, Other GBR, Non-GBR, etc.) or a class of subscription availed by such end-users (for e.g., Gold, Silver, Bronze, etc.).

At step 708, the method flow comprises performing handover preparation for multiple end-users. The said step may further include considering a current loading of a target cell (say, the next serving cell), considering historical loading of target cell, and considering available dedicated preambles.

At step 710, the method flow comprises performing iterative steps for feedback of the end-users based on the connection with the end-user equipment. The said step may further include determine, firstly, that a handover attempt was completed successfully, secondly, the duration of the end-user connection and/or disconnection, and thirdly, any change in the end-user service class. The method flow as illustrated in FIG. 7 is a continuous method and may occur throughout the period of time that the user equipment is connected to the wireless network.

The invention also encompasses utilizing Artificial Intelligence (AI) based systems for implementing the invention. For instances, the invention encompasses utilizing explicitly and/or implicitly trained classifiers, in connection with performing inference and/or probabilistic determinations and/or statistical-based determinations as in accordance with one or more aspects of the disclosed subject matter as described herein.

For another instance, the AI based systems may be used for implementing the handover engine [106] for proactive and predictive handover of user equipment. Such AI based handover engine [106] may be configured to automatically predict the routes of the users and proactively take decision for handover based on the received signal strength data from a source cell along the route. The AI based handover engine [106] may also be configured to automatically calculate a rate of precision data of the route of a user, and/or a change in a rate of increase of signal power of the at least one target cell based on the signal strength data. The AI based handover engine [106] may, thus, be configured to automatically identify the best route cell.

In another instance, the AI based system can be used, via the handover engine [106] component, to automatically receive data associated with public transport, navigation routes, end user population, specific end user on network, and one or more target cell transmissions. Thus, the AI based handover engine [106] may be configured to automatically determine a trend in route change. Further, the AI based handover engine [106] may be configured to automatically predict a time to trigger handover based on the trend, and to automatically initiate the handover based on the time.

Further, the invention encompasses the method of handover as described herein that may be implemented in all of the following embodiments:
A. Initial Handover Channel Selection (IHCS)
B. Periodic Channel Selection (PCS)
   evaluate radio environment at a configurable schedule
C. Dynamic Handover Channel Selection (DHCS)
   regular evaluation of neighbor handover list and/or performance statistics (KPIs)
   detect handover channel conflict and/or degradation of radio conditions
   trigger channel handover reselection and reconfigure to optimal handover channel Further, this method can also be implemented in a variety of self-optimization network architectures such as:
A. Distributed (DSON)
   implementation resides entirely within the Wi-Fi AP, eNB or gNB or RNC.
B. Centralized (CSON)
   implementation resides entirely within a centralized server (or server cluster)
C. Hybrid (HSON)
   implementation contains both distributed and centralized aspects Thus, the invention as described herein provides a technical and advanced solution of performing proactive handover of user equipment in a wireless network, or a HetNet environment. While the conventional handover techniques can reduce handoff reliability and decrease cell coverage, the invention described here presents a novel automatic method for proactive predicting the routes of mobility users in wireless network for handover based upon proactive measures like expected end-user route(s), which are discovered from external network sources and/or feedback mechanism learning from the history of user-specific behavior using data analytics modules in either a sparse or dense wireless network serving a particular area, in order to maximize the optimal utilization of available wireless band to achieve higher aggregate network throughput, and achieve improved overall user experience.

The interface, module, memory, database, processor and component depicted in the figures and described herein may be present in the form of a hardware, a software and a combination thereof. Connection shown between these components/module/interface in the network entity [100] are exemplary and any components/module/interface in the network entity [100] may interact with each other through various logical links and/or physical links. Further, the components/module/interface may be connected in other possible ways.

Though a limited number of servers, network entities, interface, module, memory, database, processor and component have been shown in the figures, however, it will be appreciated by those skilled in the art that the overall system of the present invention encompasses any number and varied types of the entities/elements. Further, although the invention has been described to be implemented in a single network entity [100], it is possible that the invention is implemented in multiple network entities simultaneously to provide the optimal proactive handover solution.

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

We claim:

1. A method for performing handover in a wireless network, the method being performed by a network entity, the method comprising:
    establishing a connection between a user equipment and a wireless network via a serving cell;
    dynamically receiving at least one of a public transportation data, an end-user population handover performance data, a navigation data, and an end user handover performance data;
    predicting at least one wireless handover route based on an analysis of at least one of the public transportation data, the end-user population data, the navigation data, and the end user data;
    calculating a handover target probability for the at least one predicted wireless handover route;
    analyzing the handover target probability to determine a next serving cell for the user equipment along the predicted at least one wireless handover route;
    continuously monitoring the user equipment to determine an event for handover of the user equipment; and
    proactively handing over the user equipment from the serving cell to the next serving cell, proactively handing over the user equipment from the serving cell to the next serving cell comprising:
        configuring the user equipment for proactive handover;
        detecting at least one condition for proactive handover preparation;
        preparing the wireless network and the user equipment for the proactive handover;
        detecting conditions for proactive handover execution; and
        reserving at least one resource of the wireless network for the proactive handover execution.

2. The method as claimed in claim 1, wherein analyzing the handover target probability to determine the next serving cell for the user equipment along the predicted at least one route, further comprises:
    identifying at least one candidate serving cell along the at least one predicted wireless handover route;
    assigning an initial score to the at least one candidate serving cell along the at least one predicted wireless route;
    dynamically modifying the initial score of the at least one candidate serving cell along the at least one predicted wireless route based on:
        the at least one candidate serving cell being already assigned to at least one user equipment,
        signal strength of the at least one candidate serving cell, and
        channel overlapping parameter of the at least one candidate serving cell;
    applying a handover bias to the initial score of the at least one candidate serving cell; and
    selecting the at least one candidate cell as the next serving cell based on at least the modified score of the at least one candidate cell.

3. The method as claimed in claim 2, wherein the at least one candidate cell is selected as the next serving cell to minimize a handover interference.

4. The method as claimed in claim 1, wherein the handover target probability is analyzed based on at least one of a current traffic loading and a time duration.

5. The method as claimed in claim 1, the method further comprising:
    releasing unused resources of the wireless network.

6. The method as claimed in claim 1, the method further comprising:
    grouping the one or more user equipment based on at least one of a category of service and a subscription type.

7. The method as claimed in claim 1, wherein the method is implemented using artificial intelligence (AI) for proactive and predictive handover of the user equipment to automatically predict the routes of the users and proactively take decision for handover.

8. A network entity, comprising:
    a memory unit;
    a transceiver connected to the memory unit, the transceiver configured to:
        establish a connection between a user equipment and the wireless network via a serving cell; and
        receive at least one of a public transportation data, an end-user population handover performance data, a navigation data, and an end user handover performance data;
    a processor connected to the transceiver and the memory unit, the processor configured to:
        predict at least one wireless handover route based on an analysis of at least one of the public transportation data, the end-user population data, the navigation data, and the end user data; and
        calculate a handover target probability for the at least one predicted wireless handover route;
    a handover engine connected to the processor, the transceiver and the memory unit, the handover engine configured to:
        analyze the handover target probability to determine a next serving cell for the user equipment along the predicted at least one wireless handover route;
        monitor the user equipment to determine an event for handover of the user equipment;
        proactively hand over the user equipment from the serving cell to the next serving cell;
        configure the user equipment for proactive handover;
        detect at least one condition for proactive handover preparation;
        prepare the wireless network and the user equipment for the proactive handover;
        detect conditions for proactive handover execution; and
        reserve at least one resource of the wireless network for the proactive handover execution.

9. A network entity, comprising:
    a memory unit;
    a transceiver connected to the memory unit, the transceiver configured to:
        establish a connection between a user equipment and the wireless network via a serving cell; and receive at least one of a public transportation data, an end-user population handover performance data, a navigation data, and an end user handover performance data;

a processor connected to the transceiver and the memory unit, the processor configured to:

predict at least one wireless handover route based on an analysis of at least one of the public transportation data, the end-user population data, the navigation data, and the end user data; and calculate a handover target probability for the at least one predicted wireless handover route;

a handover engine connected to the processor, the transceiver and the memory unit, the handover engine configured to:

analyze the handover target probability to determine a next serving cell for the user equipment along the predicted at least one wireless handover route;

monitor the user equipment to determine an event for handover of the user equipment;

proactively hand over the user equipment from the serving cell to the next serving cell;

identify at least one candidate serving cell along the at least one predicted wireless handover route;

assign an initial score to the at least one candidate serving cell along the at least one predicted wireless route;

modify the initial score of the at least one candidate serving cell along the at least one predicted wireless route based on:

the at least one candidate serving cell being already assigned to at least one user equipment, signal strength of the at least one candidate serving cell, and channel overlapping parameter of the at least one candidate serving cell;

apply a handover bias to the initial score of the at least one candidate serving cell; and select the at least one candidate cell as the next serving cell based on at least the modified score of the at least one candidate cell.

* * * * *